July 27, 1937.    H. MAILÄNDER    2,088,028
HYDRAULIC MACHINE
Filed Sept. 23, 1936
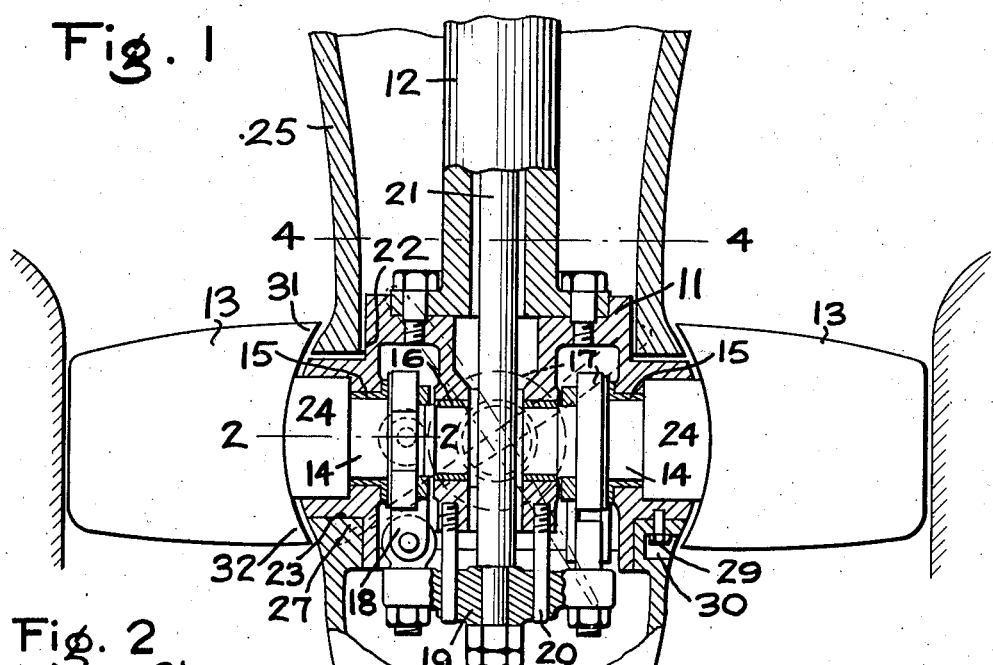
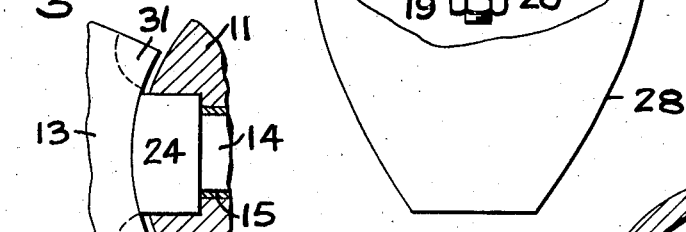
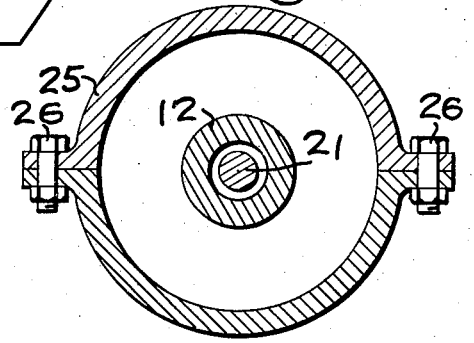
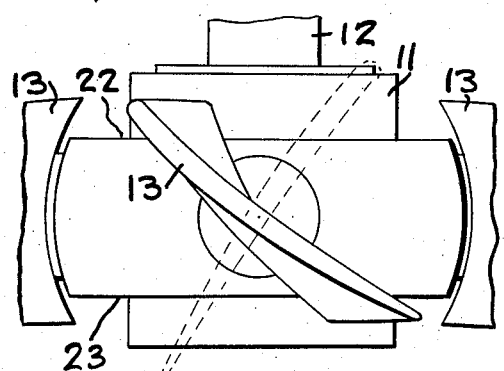
Inventor
HEINRICH MAILAENDER
By Malcolm F. Gannett
Attorney Patented July 27, 1937

2,088,028

UNITED STATES PATENT OFFICE 2,088,028

HYDRAULIC MACHINE

Heinrich Mailänder, Giengen (Brenz), Germany, assignor to J. M. Voith, Brenz, Germany, and St. Polten, Austria, a copartnership composed of Dr. Walther Voith, St. Polten, Austria, Dr. Hermann Voith, Brenz, Germany, and Dr. Hanns Voith, Brenz, Germany Application September 23, 1936, Serial No. 102,153
In Germany September 30, 1935

2 Claims. (Cl. 253—148)

This invention relates to hydraulic machines, such as hydraulic turbines, pumps and the like, and more particularly to the type of hydraulic machines having runners with movable or adjustable blades.

An object of the invention is to provide an improved hydraulic machine having adjustable blades in which the hub of the runner is so formed that the blades can be rotated through an angle of at least 90° with respect to the normal position of the blades, so that the runner blades can be inspected or repaired without removing the runner from its setting.

Another object of the invention is to provide an improved hydraulic machine of the above type in which the runner is so formed that the inner shoulders of the runner blades are readily accessible for inspection and repair while the runner is installed in its setting.

Another object of the invention is to provide an improved hydraulic machine of the above type in which the runner is so constructed as to permit repair work on the suction side of the runner blades without the necessity of removing the runner from its setting.

Another object of the invention is to provide an improved hydraulic machine of the character mentioned, which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawing:—

Figure 1 is a vertical section of the runner of a hydraulic machine having adjustable blades, showing the application of the present invention thereto;

Fig. 2 is a horizontal section taken on the line 2—2 of Fig. 1;

Fig. 3 is an elevation of the central portion of the hub of the runner, showing one of the blades in two different positions; and Fig. 4 is a horizontal section taken on the line 4—4 of Fig. 1.

Heretofore, in the construction of the runners of hydraulic machines having adjustable blades, it was necessary in case of repair work at the suction side of the blades, to either dismantle the whole runner or to work overhead. In particularly bad cases of repair, it was necessary to remove the runner from its setting, which, of course, resulted in great expense and loss of time.

According to the present invention, the runner is so constructed that the runner blades may be located at least 90° from their normal position, thereby placing the blades in such a position that work on the suction side of the blades can be accomplished without difficulty. Thus, by the present invention, runners of even the largest dimensions may be inspected and repaired while positioned in their setting without necessitating expensive and time wasting dismantling work. The repair work usually required to be done to the blades of the runners, in many instances, relates to welding work required to repair the surfaces of the blades after the same have been damaged by mechanical or chemical corrosion.

Referring to the drawing, the hub 11 of the runner is fixed to the lower end of a hollow shaft 12. As shown, the outer surface of the hub 11 may have a spherical contour.

A suitable number of blades 13 are rotatably supported in the hub 11 of the runner and project radially therefrom. The inner portion of each blade is formed with a trunnion 14 which is journalled in bearings 15 and 16 supported in the hub 11.

Means are provided for simultaneously rotating all of the blades 13 and for maintaining them in equal angular relationship, such means comprising preferably an arm 17 rigidly fixed on the trunnion 14 of each blade, and links 18, which pivotally connect the arms on the different blades to a cross head 19.

The cross head 19 is guided to reciprocate in a direction axially of the runner, by guide pins 20 mounted in the hub of the runner, in the manner shown in Fig. 1.

The cross head 19 is bolted or otherwise fixed to the lower end of an operating rod 21 which extends upwardly through the hollow shaft 12 and is adapted to be operated by suitable mechanism (not shown), such for instance as that shown in United States Patent No. 1,937,772, granted December 5, 1933 to Daniel J. McCormack, for Hydraulic turbine.

Movement of the above referred to operating mechanism is transmitted by rod 21 to the cross head 19, and from said cross head such movement will be transmitted by the links 18 to the runner blades 13, thereby effecting an adjustment or change in position of said blades. This movement of the blades is somewhat limited, and obviously the suction side of the blades, which is normally on the underneath side of said blades, is inaccessible for inspection or repair. Therefore, in order to enable the blades to be turned on their trunnions so as to present the suction side thereof in an accessible and convenient position, it has been found advantageous to construct the runner in such a manner as to permit the runner blades to be rotated through a considerable angle.

According to the present invention the upper and lower portions of the hub 11 are formed with perceptible cut out portions 22 and 23. These cut out portions should preferably be located adjacent to the hub 24 of each blade 13, so as to provide deep recesses in the spherical outer surface of the hub.

The cut out portion 22 is, during normal operation of the runner, enclosed by a split ring or housing 25. The housing 25 is, as shown in Fig. 4, preferably constructed of two semi-circular parts which are secured together by any suitable means. In the present instance the two parts of the housing 25 are shown as being detachably connected by means of bolts 26.

The lower cut out portion 23 of the runner hub 11 is normally closed by the upper portion 27 of a deflector 28. The deflector 28 is detachably secured to the main body of the hub 11 by means of a series of bolts 29, one of which is shown in Fig. 1 of the drawing. The bolts 29 are disposed in recesses 30 formed in the portion 27 of the deflector 28, and it will be understood that said recesses can be enclosed by a suitable cover (not shown), so that the flow of the water past the runner will not be impaired.

Each runner blade 13 has shoulders 31 and 32 at its inner end portion which shoulders are disposed adjacent to the outer spherical surface of the runner hub 11.

As shown in Fig. 1, the cut out portions 22 and 23 are of sufficient depth to expose the shoulders 31 and 32 of the runner blades when the housing 25 and deflector 28 are removed from the runner. Furthermore, the depth of the cut out portions 22 and 23 is such as to permit rotation of the runner blades about their axes through an angle of at least 90°, as shown in Fig. 3, when the housing 25 and deflector 28 are removed from the hub of the runner without the shoulders 31 and 32 coming in contact with the spherical exterior surface of the hub 11.

Therefore, when the housing 25 and deflector 28 are removed from the runner hub, due to the provision of the cut out portions 22 and 23, a considerable open space is provided by which welding work or other work may be done on the inner portions of the runner blade 14 (see Fig. 3), and consequently, when it is desired to repair the pitted surfaces on the suction side of the runner blades, such work can be readily accomplished without removing the runner from its setting.

It is to be understood, that, according to the present invention, it is immaterial whether the cut out portions 22 and 23 extend over the entire periphery of the hub or whether such portions are only formed on the hub at the point at which the inner shoulders 31 and 32 of the runner blades pass when said blades are rotated. However, in the present instance, said cut out portions are shown as being formed coextensive of the exterior of the hub.

When it is desired to position the runner blades 13 for inspection or repair work, the operating rod 21 is disconnected from the cross head 19. The cross head 19 can then be operated so as to shift the runner blades to the desired position.

Having thus described my invention what I claim is:—

1. A runner for hydraulic machines comprising a hub, a plurality of blades adjustably mounted in said hub, means within said hub for operating said blades, said operating means being adapted to rotate the blades through a predetermined limited angle, upper and lower notches formed in and encircling the exterior of said hub on opposite sides of the axis of said blades, and detachable means for normally enclosing said notches, said notches permitting free unrestricted rotation of the runner blades when said blade operating means are disconnected from the blades and said detachable means are removed from the runner.

2. A runner for hydraulic machines comprising a hub, a plurality of blades adjustably mounted in said hub, means within said hub and detachably connected to the blades for operating said blades through a limited angle, and means formed in and encircling the exterior of the hub on opposite sides of the axis of said blades for permitting unrestricted rotation of the blades so as to expose normally inaccessible portions of the blades when said operating means is disconnected from the blades.

HEINRICH MAILÄNDER.